United States Patent [19]

Yoshikawa et al.

[11] 4,104,192
[45] Aug. 1, 1978

[54] OXYGEN ABSORBENT

[75] Inventors: Yoshio Yoshikawa, Ushiku; Akira Amemiya, Kana; Sigeru Kimoto; Hidenori Kimpara, both of Tokyo, Japan

[73] Assignee: Mitsubishi Gas Chemical Company Inc., Tokyo, Japan

[21] Appl. No.: 760,817

[22] Filed: Jan. 19, 1977

[30] Foreign Application Priority Data

Jan. 26, 1976 [JP] Japan .................................. 51-7300

[51] Int. Cl.$^2$ ..................... C09K 15/00; C01B 17/64
[52] U.S. Cl. ................................. 252/188; 423/221; 426/544
[58] Field of Search ................ 252/188, 439; 423/219, 423/221, 515; 426/541, 544

[56] References Cited

U.S. PATENT DOCUMENTS 2,825,651   3/1958   Loo et al. ............................. 252/188

Primary Examiner—Benjamin R. Padgett
Assistant Examiner—Christine M. Nucker
Attorney, Agent, or Firm—Flynn & Frishauf

[57] ABSTRACT

An oxygen absorbent comprising a dithionite and at least one compound having water of crystallization or water of hydration is disclosed.

12 Claims, No Drawings

OXYGEN ABSORBENT

BACKGROUND OF THE INVENTION

This invention relates to an oxygen absorbent, and particularly relates to an oxygen absorbent comprising a dithionite and a compound having water of crystallization or water of hydration.

In order to preserve foodstuffs, such as vegetables, fishes, shellfishes, meats, processed foodstuffs, such as potato chips, cakes, peanuts, etc., and so on, it is necessary to prevent the foodstuffs' from getting moldy and from putrefying. Prior art methods have used freezer storage, CA cold storage, vacuum packaging and replacing the gas present in the inner part of packaging by an inert gas for preventing foodstuffs from getting moldy and putrefying. Additives, such as antioxidant, have been used for preserving foodstuffs. Recently, governments have started to regulate the use of additives for food, since it is realized that some additives are injurious to humans. The freezer storage method requires large-scale apparatus and complicated operation, so the freezer storage method is costly.

Molds or eumycetes, bacterias and higher organisms such as insects tend to disturb preservation of foodstuffs. These mold eumycetes, bacterias and insects live and grow in the presence of oxygen and cause putrefaction and change in quality of foodstuffs.

Therefore, if oxygen can be selectively removed from the atmosphere in which the foodstuffs is packed, the problem of putrefaction and change in quality of foodstuffs can be overcome, and it will become possible to preserve foodstuffs for a long time.

It was known in the prior art that a dithionite reacts with oxygen in the presence of water to form a sulfate and sulfurous acid gas. By utilizing this property of dithionite a disoxidant or an oxygen absorbent comprising a dithionite, an alkaline material and activated carbon was known in the prior art (Japanese Pat. No. 686,561). The known disoxidant is prepared by mixing each component in a perfectly dry state. A small amount of water is added to the resulting mixture at the time of using the disoxidant. The known disoxidant has the following shortcomings:

(1) It is necessary to use a large amount of activated carbon in the disoxidant in order to prevent the disoxidant from hardening.

(2) Since, in the order of addition, water is the last component to be added to the composition, water is not uniformly distributed throughout the composition.

In general, activated carbon has deodorizing action, so it was said that the use of activated carbon for removing sulfurous acid gas as well as a gas generated from a dithionite is preferred. In this case, the amount of activated carbon present in the oxygen absorbent comprising dithionite, an alkaline material and activated carbon is as high as 50% by weight per 100 parts of the alkaline material. The above amount of activated carbon exceeds the amount of activated carbon required for deodorizing. Too great an amount of an oxygen absorbent containing excess activated carbon is required for exhibiting a desired oxygen-absorbing ability. In addition, since uneven distribution of water in the absorbent results in causing different rates of absorbing oxygen, an oxygen absorbent having a desired rate of absorbing oxygen can not be obtained. When a relatively large amount of water is added to the oxygen absorbent, water is likely to be uniformly distributed. But since the oxygen-absorbing rate of the oxygen absorbent containing a large amount of water becomes large, some of the dithionite reacts with oxygen in air before the use of the absorbent, and therefore, addition of a large amount of water results in a considerable amount of the dithionite. When the oxygen-absorbing rate is large, a rapid rise in temperature occurs through exothermic reaction. Such rise in temperature may be dangerous. In order to uniformly distribute water throughout the absorbent a process for adding water-containing sawdust to the absorbent has been proposed in place of direct addition of water thereto, but the process is not practical.

U.S. Pat. No. 2,825,651 proposes a process for preparing an oxygen absorbent comprising mixing a finely divided sulfite and a finely divided metal salt and compression-pelletizing the mixture in order to increase the rate of the oxidation of sulfite. However it was found that the rate of oxidation of the sulfite in the oxygen absorbent was not sufficient, and the absorbent has a low oxygen-absorbing rate.

SUMMARY OF THE INVENTION

We have carried out a wide range of research to find an oxygen absorbent which has neither the above shortcomings, nor reacts with oxygen in air before the use thereof. As a result, we have found that when a dithionite is mixed with a compound having water of crystallization, an oxygen absorbent not having the above shortcoming can be obtained.

Therefore, an object of this invention is to provide an oxygen absorbent which hardly react with oxygen before use but absorbs oxygen at a suitable rate at the time of using it. In other words, the oxygen absorbent of the present invention keeps a good absorbing ability of oxygen for a long time.

DETAILED DESCRIPTION OF THE INVENTION

This invention relates to an oxygen absorbent comprising a dithionite and at least one compound having water of crystallization or water of hydration, and substantially free from free water.

The term "oxygen absorbent" in the specification and the claim means an agent for absorbing oxygen.

The term "compound having water of crystallization or water of hydration" means compound having a water molecule and another component's molecule bonded to each other in a fixed ratio in its crystal structure. Examples of the compounds having water of crystallization include the following compound having water of crystallization: inorganic compounds, such as metal oxides, metal hydroxides, sulfides, halides, sulfates, sulfites, thiosulfates, nitrates, borates, phosphates, hydrogenphosphates, pyrophosphates, hydrogenpyrophosphates, carbonates, hydrogencarbonates, silicates, metasilicates, chromates, iodites, bromates, trimolybdates, tungstates, and ammonium salts; and organic compounds, such as organic acids, and organic salts.

The compound having water of crystallization or water of hydration has a catalytic action to the reaction of the dithionite with oxygen. An oxygen absorbent which has a desired oxygen-absorbing rate and the absorption reaction of which occurs at a desired temperature can be obtained by selecting the kind of the compound having water of hydration, the proportion thereof and the combination of two or more of said compounds. To the contrary, a compound not having water of hydration does not have such catalytic action.

The term "dithionite" means a compound represented by the formula $$M_xS_2O_4$$

wherein M is cation, when valence of M is 1, $x$ is 2, and when valence of M is 2, $x$ is 1. The dithionite is generally called hydrosulfite. Examples of the dithionite include sodium dithionite ($Na_2S_2O_4$) and zinc dithionite ($ZnS_2O_4$). Sodium dithionite is preferred.

The amount of the compound having water of crystallization (sometimes referred to as catalytic compound) added to the dithionite is not critical. Conveniently, the amount of compound used may be in the range of from about 0.2 parts to about 2000 parts by weight, preferably from about 1 part to 1000 parts by weight, per 100 parts by weight of the dithionite. One of the compounds or two or more of the compounds may be used in the present invention.

The catalytic compounds are of two types: one is a compound exhibiting the catalytic action at room temperature and the other is a compound not exhibiting the catalytic action at room temperature, but exhibiting the catalytic action only when heated at as high as 90° C or more.

The catalytic compounds exhibiting the catalytic action at room temperature include, such as, sodium carbonate decahydrate, sodium carbonate heptahydrate, sodium sulfate decahydrate, sodium sulfate heptahydrate, zinc sulfate heptahydrate, mixture of manganese sulfate tetra-, penta- and hexahydrate, ferrous sulfate heptahydrate, cerium sulfate tetrahydrate, sodium sulfite heptahydrate, calcium chloride hexahydrate, nickel chloride hexahydrate, sodium tetraborate decahydrate, sodium metaborate tetrahydrate, sodium pyrophosphate decahydrate, sodium tertiary phosphate dodecahydrate, disodium hydrogenphosphate dodecahydrate, sodium dihydrogenphosphate dihydrate, sodium metasilicate nonahydrate, barium hydroxide octahydrate, lithium hydroxide monohydrate, strontium hydroxide octahydrate, lead acetate trihydrate, oxalic acid dihydrate and mixture thereof. Of these compounds, most preferable compounds are as follows: sodium carbonate decahydrate, sodium carbonate heptahydrate, sodium sulphate decahydrate, sodium sulfate heptahydrate, manganese sulfate tetra-, penta- and hexahydrate, ferrous sulfate heptahydrate, sodium sulfite heptahydrate, calcium chloride hexahydrate, sodium tetraborate decahydrate, sodium metaborate tetrahydrate, sodium tertiary phosphate dodecahydrate, disodium hydrogen phosphate dodecahydrate, and sodium metasilicate nonahydrate.

The catalytic compounds exhibiting the catalytic action only when heated at as high as 90° C or more include, such as, sodium thiosulfate pentahydrate, copper sulfate pentahydrate, nickel sulfate heptahydrate, $CaSO_4.\frac{1}{2}H_2O$, barium chloride dihydrate, calcium chloride dihydrate, molybdic acid monohydrate, sodium carbonate monohydrate, sodium acetate trihydrate and mixture thereof.

The oxygen absorbent of this invention may contain as third component(s) (a) at least one anhydrous alkaline material, such as sodium hydroxide potassium hydroxide, sodium carbonate, sodium bicarbonate, potassium carbonate, potassium bicarbonate, sodium phosphate, sodium tetraborate, magnesium hydroxide, calcium hydroxide and mixture thereof and/or (b) at least one adsorbent, such as activated carbon, zeolite silica gel, alumina, diatomaceous earth, activated clay and mixture thereof. When such alkaline material and or such adsorbent are contained in the oxygen absorbent of this invention, the generation of sulfurous acid gas can further be prevented. When an alkaline material is used as the compound having water of crystallization or water of hydration, the alkaline material can prevent the generation of sulfurous acid gas without addition of the third component.

The amount of the adsorbent incorporated in the oxygen absorbent may be in the range of from about 2 to about 75 parts by weight per 100 parts by weight of the dithionite.

When an alkaline material is used as a compound having water of hydration, the amount of the alkaline material incorporated in the oxygen absorbent as the third component may be in the range of from 0 to about 2400 parts by weight per 100 parts by weight of the dithionite. When alkaline material is not used as the compound having water of crystallization, the amount of the alkaline material incorporated in the oxygen absorbent as the third component may be in the range of from about 150 to about 2400 parts by weight per 100 parts by weight of the dithionite.

The oxygen absorbent of the present invention has relatively slow oxygen-absorbing rate, so handling of the absorbent as well as the preparation of the absorbent are easy. The oxygen-absorbing rate of the present oxygen absorbent depends on the kind of the catalytic compound, the proportion thereof and the combination of two or more catalytic compounds. So an oxygen absorbent having a desired oxygen-absorbing rate according to the object of use can be obtained. When the present oxygen absorbent is preserved while be isolated from oxygen, little dithionite decomposes, and the absorbent is hardly hardened during the preservation and during using it.

The present oxygen absorbent should be preserved while being isolated from oxygen. In addition, the present oxygen absorbent can be used as it is without any addition of water to the absorbent.

For example, the present oxygen absorbent can be stored in a sealed bag made of inpermeable material, such as aluminum foil, polyester, polyvinylidene chloride and the like. When the seal is broken, the absorbent begins to absorb oxygen.

The oxygen absorbent of this invention is usable in a variety of industrial fields, but is particularly useful for preventing change in quality of fresh vegetables, fresh fish and shellfish, and processed foodstuffs, such as potato chips, cakes, peanuts, oil and the like, and for anti-oxidizing metals and organic chemicals.

The present invention is further illustrated by the following Examples and Comparative Examples. However, this invention should not be limited by these examples and comparative examples. The percent and parts in the Examples are based on weight unless otherwise specified.

EXAMPLE 1

Three grams of anhydrous sodium dithionite (85% pure) was thoroughly mixed with each of the particulate compounds having water of crystallization as shown in Table 1 in the amount as shown in Table 1 in a nitrogen atmosphere. Each of the mixtures was placed in a 1l sealed glass bottle equipped with an Hg manometer, which contains dried air. The absorption reaction was carried out at 25° C. The degree of reduced pressure in the glass bottle was periodically determined by Hg manometer at 25° C, thereby calculating the proportion of oxygen removed or absorbed. After the absorption reaction had continued for 72 hours, quantitative analysis for residual oxygen and generated sulfurous acid gas was carried out by using the Hempel method and detector tube for 1 to 80 ppm, respectively. The results are shown in Table 1.

For comparison, absorbing tests on only the dithionite and the mixture of the dithionite and anhydrous compound were carried out. The results are also shown in Table 1.

Table 1

| Compound having water of crystallization and amount thereof added | Time required for removing 50% of oxygen in the bottle | Gas analysis after 72 hrs | |
|---|---|---|---|
| | | residual oxygen (% by volume) | residual sulfurous acid gas (ppm) |
| Example | | | |
| sodium carbonate decahydrate (20 gr) | less than 5 minutes | less than 0.2 | less than 1 |
| sodium carbonate heptahydrate (15 gr) | less than 5 minutes | " | " |
| sodium borate decahydrate (10 gr) | 1 hr | " | " |
| sodium borate decahydrate (5 gr) | 4 hrs | " | " |
| sodium metaborate tetrahydrate (7 gr) | 2 hrs | " | " |
| disodium hydrogenphosphate dodecahydrate (20 gr) | 5 minutes | " | " |
| barium hydroxide octahydrate (11 gr) | 30 minutes | " | " |
| sodium pyrophosphate decahydrate (13 gr) | 18 hrs | " | " |
| lithium hydroxide monohydrate (12 gr) | less than 5 minutes | " | " |
| sodium metasilicate nonahydrate (9 gr) | 10 minutes | " | " |
| strontium hydroxide octahydrate (9 gr) | less than 5 minutes | " | " |
| sodium tertiary phosphate dodecahydrate (9 gr) | 20 minutes | " | " |
| Control | | | |
| none | — | 21.0 | — |
| anhydrous sodium carbonate (20 gr) | — | 21.0 | — |
| anhydrous sodium borate (10 gr) | — | 21.0 | — |
| anhydrous sodium metaborate (7 gr) | — | 21.0 | — |
| anhydrous disodium hydrogenphosphate (20 gr) | — | 21.0 | — |

EXAMPLE 2

Three grams of anhydrous sodium dithionite (85% pure), 12 gr of dried calcium hydroxide or magnesium hydroxide was thoroughly mixed with each of the particulate compounds having water of crystallization as shown in Table 2 in the amount as shown in Table 2 in a nitrogen atmosphere. Test procedure and gas analysis were carried out in the same way as in Example 1. For comparison, the tests on the composition containing anhydrous compound in place of the catalytic compound were carried out. The results are shown in Table 2.

Table 2

| Alkaline material | Compound having water of crystallization and amount thereof added | Time required for removing 50% of oxygen in the bottle | Gas analysis after 72 hrs | |
|---|---|---|---|---|
| | | | residual oxygen (% by volume) | residual sulfurous acid gas (ppm) |
| Example | | | | |
| Mg(OH)$_2$ | sodium carbonate decahydrate (0.5 gr) | less than 5 minutes | less than 0.2 | less than 1 |
| " | sodium carbonate heptahydrate (1 gr) | less than 5 minutes | " | " |
| Ca(OH)$_2$ | disodium hydrogenphosphate dodecahydrate (5 gr) | less than 5 minutes | " | " |
| " | sodium metaborate tetrahydrate (11 gr) | 2 hrs | " | " |
| " | sodium dihydrogenphosphate dihydrate (20 gr) | 5 hrs | " | " |
| " | calcium chloride hexahydrate (4 gr) | 1 hr | " | " |
| " | sodium sulfite heptahydrate (2 gr) | 10 minutes | " | " |
| Ca(OH)$_2$ | sodium sulfate decahydrate (1 gr) | less than 5 minutes | " | " |
| " | nickel chloride hexahydrate (10 gr) | 6 hrs | " | " |
| Mg(OH)$_2$ | zinc sulfate heptahydrate (11 gr) | 13 hrs | " | " |
| Ca(OH)$_2$ | mixture of manganese sulfate tetra, penta and hexahydrate (14 gr) | 4 hrs | " | " |
| " | ferrous sulfate heptahydrate (9.8 gr) | 4 hrs | " | " |
| " | cerium sulfate tetrahydrate (5 gr) | 40 minutes | " | " |
| " | lead acetate trihydrate (12 gr) | 12 hrs | " | " |
| " | sodium sulfate heptahydrate (1 gr) | less than 5 minutes | " | " |
| " | oxalic acid dihydrate (20 gr) | 12 hrs | " | " |
| Control | | | | |
| Mg(OH)$_2$ | anhydrous sodium carbonate (1 gr) | — | 21.0 | — |
| Ca(OH)$_2$ | anhydrous disodium hydrogenphosphate (5 gr) | — | 21.0 | — |
| " | anhydrous sodium dihydro- | | | |

Table 2-continued

| Alkaline material | Compound having water of crystallization and amount thereof added | Time required for removing 50% of oxygen in the bottle | Gas analysis after 72 hrs residual oxygen (% by volume) | residual sulfurous acid gas (ppm) |
|---|---|---|---|---|
| " | genphosphate (20 gr) | — | 21.0 | — |
| " | anhydrous calcium chloride (4 gr) | — | 21.0 | — |
| " | anhydrous sodium sulfite (2 gr) | — | 21.0 | — |

EXAMPLE 3

Three grams of anhydrous sodium dithionite (85% pure) was mixed with the particulate components as shown in Table 3 in the amount shown in Table 3 in a nitrogen atmosphere. The compounds having water of crystallization were particulate. Test procedure and gas analysis were carried out in the same way as in Example 1. The results are shown in Table 3.

Table 3

| Compounds having water of crystallization and amount of the compound added (gr) | Amount of dried calcium hydroxide added | Time required for removing 50% of oxygen in the bottle | Gas analysis after 72 hrs residual oxygen (% by volume) | residual sulfurous acid gas (ppm) |
|---|---|---|---|---|
| sodium carbonate heptahydrate (5 gr) and sodium metaborate tetrahydrate (5 gr) | non-addition | less than 5 minutes | less than 0.2 | less than 1 |
| disodium hydrogenphosphate dodecahydrate (1 gr) and sodium sulfate decahydrate (1 gr) | 12 gr | less than 5 min. | " | " |
| sodium borate decahydrate (10 gr) and sodium sulfite heptahydrate (2 gr) | non-addition | 10 minutes | " | " |
| calcium chloride hexahydrate (5 gr) and sodium dihydrogenphosphate dihydrate (5 gr) | 12 gr | 1 hr | " | " |
| sodium carbonate decahydrate (2 gr) and sodium borate decahydrate (2 gr) | 12 gr | less than 5 minutes | " | " |

EXAMPLE 4

Three grams of anhydrous sodium dithionite (85% pure) was mixed with the particulate components shown in Table 4 in the amount shown in Table 4 in a nitrogen atmosphere. The activated carbon employed was dried and particulate. Test procedure and gas analysis were carried out in the same way as in Example 1. For comparison, the above procedure was repeated except that the composition not containing the compound having water of crystallization and the composition containing an anhydrous compound in place of the catalytic compound were used. The results are shown in Table 4.

Table 4

| Compound having water of crystallization and amount thereof added (gr) | Amount of dried calcium hydroxide added (gr) | Amount of activated carbon added (gr) | Time required for removing 50% of oxygen in the bottle | Gas analysis after 72 hrs residual oxygen (% by volume) | residual sulfurous acid gas (ppm) |
|---|---|---|---|---|---|
| Example | | | | | |
| sodium borate decahydrate (10 gr) | non-addition | 0.5 | 1 hr | less than 0.2 | less than 1 |
| sodium carbonate decahydrate (1 gr) | 12 | 0.5 | less than 5 minutes | " | " |
| sodium dihydrogenphosphate dihydrate (20 gr) | 12 | 0.5 | 6 hrs | " | " |
| Control | | | | | |
| none | 12 | — | — | 21.0 | " |
| none | 12 | 0.5 | — | 21.0 | " |
| none | non-addition | 12 | — | 21.0 | " |
| anhydrous sodium carbonate (1 gr) | 12 | 0.5 | — | 21.0 | " |
| anhydrous sodium sulfate (10 gr) | 12 | 0.5 | — | 21.0 | " |

EXAMPLE 5

Nine grams of anhydrous sodium dithionite (85% pure) was mixed with the components as shown in Table 5 in the amount as shown in Table 5 in a nitrogen atmosphere. Each of the mixtures was usually divided into three parts, and the first one-third of each mixture was immediately placed in a 2l triangle glass flask equipped with Hg manometer, which contains dried air. The absorption reaction was carried out at 20° C until oxygen was absorbed no longer. The degree of reduced pressure in the bottle was determined by Hg manometer at 25° C, thereby calculating the amount of oxygen removed or absorbed.

The remaining two-thirds were left standing in a 100 ml sealed glass bottle at 22° C to 25° C for 1 week or one month, respectively. Thereafter, the absorption tests of each mixture aliquot left standing for 1 week or one month were carried out in the same way as above.

The ratio of the oxygen absorption of each mixture aliquot left standing for the above specified periods to that of each mixture aliquot which was not left standing was calculated. The results are shown in Table 5. The data show that the smaller the ratio, the more the quality of mixture was impaired.

For comparison, the above procedure was repeated except that water was used in place of the compound having water of crystallization. The results are shown in Table 5 as control.

Table 5

| Compound having water of crystallization and amount thereof added (gr) or amount of water added (gr) | Amount of dried calcium hydroxide added (gr) | Amount of dried activated carbon added (gr) | * After one week | After one month |
|---|---|---|---|---|
| Example | | | | |
| sodium carbonate decahydrate (60 gr) | — | — | 91.6 | 87.3 |
| sodium carbonate heptahydrate (45 gr) | — | — | 91.9 | 88.2 |
| sodium borate decahydrate (30 gr) | — | — | 93.2 | 89.1 |
| sodium metaborate tetrahydrate (21 gr) | — | — | 92.1 | 88.5 |
| disodium hydrogenphosphate dodecahydrate (60 gr) | — | — | 90.2 | 87.0 |
| sodium carbonate decahydrate (3 gr) | 36 | 1.5 | 91.1 | 86.9 |
| sodium borate decahydrate (30 gr) | — | 1.5 | 92.9 | 89.3 |
| calcium chloride hexahydrate (12 gr) | 36 | — | 89.9 | 81.1 |
| sodium dihydrogenphosphate dihydrate (60 gr) | 36 | — | 88.1 | 82.0 |
| sodium sulfate decahydrate (4.5 gr) | 36 | — | 87.0 | 79.1 |
| sodium sulfite heptahydrate (6 gr) | 36 | — | 87.5 | 80.1 |
| nickel chloride hexahydrate (30 gr) | 36 | — | 87.7 | 79.3 |
| zinc sulfate heptahydrate (33 gr) | 36 | — | 88.3 | 79.6 |
| cerium sulfate tetrahydrate (15 gr) | 36 | — | 87.4 | 79.5 |
| mixture of manganese sulfate tetra-, penta- and heptahydrate (42 gr) | 36 | — | 87.9 | 80.6 |
| ferrous sulfate heptahydrate (29.4 gr) | 36 | — | 86.9 | 79.1 |
| sodium dihydrogenphosphate dihydrate (60 gr) | 36 | 1.5 | 88.7 | 82.0 |
| sodium sulfate decahydrate (30 gr) | 36 | 1.5 | 88.1 | 81.4 |
| Control | | | | |
| water (1.5 gr) | 36 | — | 85.0 | 73.8 |
| water (6 gr) | 36 | — | 73.2 | 46.9 |
| water (1.5 gr) | 36 | 1.5 | 85.7 | 74.7 |
| water (6 gr) | 36 | 1.5 | 73.9 | 47.5 |

Note:
mark "—" shows non-addition.
mark "*" shows the ratio of the oxygen absorption of each mixture aliquot left standing for the following specified periods to that of each mixture aliquot which was not left standing.

EXAMPLE 6

Three grams of anhydrous sodium dithionite (85% pure) was mixed with the components as shown in Table 6 in the amount as shown in Table 6 in a nitrogen atmosphere. Sodium sulfate decahydrate and sodium borate decahydrate employed were particulate. Each of the mixtures was placed in a 1l sealed glass bottle equipped with Hg manometer, which contains dried air. The degree of reduced pressure in the glass bottle was periodically determined by Hg manometer at 25° C and 5° C, thereby calculating the proportion of oxygen removed or absorbed. For comparison, the above procedure was repeated except that water was used in place of the compound having water of crystallization. The results are shown in Table 6.

Table 6

| Compound of water crystallization | | Amount of dried calcium hydroxide added (gr) | Time required for removing 50% of oxygen in the bottle | Time required for removing 50% of oxygen in the bottle |
|---|---|---|---|---|
| kinds | amount thereof added (gr) | | | |
| 25° C Example | | | | |
| sodium sulfate decahydrate | 0.200 | 12 | 15 minutes | 35 minutes |
| " | 0.150 | 12 | 20 minutes | 1 hr |
| " | 0.125 | 12 | 30 minutes | 2 hrs |
| " | 0.100 | 12 | 1 hr | 5 hrs |
| " | 0.075 | 12 | 2 hrs | 20 hrs |
| " | 0.050 | 12 | 7 hrs | 55 hrs |
| sodium borate decahydrate | 10 | — | 50 minutes | 3 hrs |
| " | 6 | — | 1.5 hrs | 10 hrs |
| " | 4 | — | 2.5 hrs | 40 hrs |
| " | 2 | — | 5.5 hrs | 75 hrs |
| " | 1 | — | 18 hrs | 125 hrs |
| 25° C Control | | | | |
| water | 0.20 | 12 | 12 minutes | 40 minutes |
| " | 0.10 | 12 | 1 hr | 20 hrs |
| " | 0.075 | 12 | 7.5 hrs | Only 80% of oxygen was removed after 10 days passed. |
| " | 0.05 | 12 | | Only 32% of oxygen was removed even after 10 days passed. |
| 5° C Example | | | | |
| sodium sulfate decahydrate | 3.2 | 12 | 4 hrs | 25 hrs |
| " | 1.6 | 12 | 7 hrs | 35 hrs |
| " | 0.8 | 12 | 9 hrs | 50 hrs |
| " | 0.4 | 12 | 12 hrs | 65 hrs |
| " | 0.2 | 12 | 18 hrs | 80 hrs |
| " | 0.1 | 12 | 40 hrs | 200 hrs |

Table 6-continued

| Compound of water crystallization | | Amount of dried calcium hydroxide added (gr) | Time required for removing 50% of oxygen in the bottle | Time required for removing 50% of oxygen in the bottle |
|---|---|---|---|---|
| kinds | amount thereof added (gr) | | | |
| 5° C Control | | | | |
| water | 0.8 | 12 | 2 minutes | 10 minutes |
| " | 0.4 | 12 | 5 minutes | 1 hr |
| " | 0.2 | 12 | 30 minutes | Only 75% of oxygen was removed even after 10 days passed |
| " | 0.1 | 12 | | Only 45% of oxygen was removed even after 10 days passed. |
| " | 0.05 | 12 | | Only 10% of oxygen was removed even after 10 days passed |

Note: The mark "—" shows non-addition.

EXAMPLE 7

The procedure of Example 1 was repeated except that 3 gr of anhydrous sodium dithionite was mixed with 20 gr of dried calcium hydroxide and the particulates components as shown in Table 7, and the absorption reaction was carried out at 90° C. For comparison, absorbing tests on the composition not containing the compound having water of crystallization and the composition containing an anhydrous compound in place of the catalytic compound were carried out.

The results are shown in Table 7.

Table 7

| Compound having water of crystallization and amount thereof added | Time required for removing 50% of oxygen in the bottle | residual oxygen (% by volume) | residual sulfurous acid gas (ppm) |
|---|---|---|---|
| Example | | | |
| Calcium chloride dihydrate (5 gr) | 30 minutes | less than 0.2 | less than 1 |
| barium chloride dihydrate (3 gr) | 1 hr | " | " |
| sodium carbonate monohydrate (5 gr) | 1 hr | " | " |
| CaSO$_4$ · ½ H$_2$O (27 gr) | 3 hrs | " | " |
| molybdic acid monohydrate (20 gr) | 2 hrs | " | " |
| sodium acetate trihydrate (3 gr) | 1 hr | " | " |
| nickel sulfate heptahydrate (5 gr) | 2 hrs | " | " |
| Control | | | |
| none | — | 21.0 | — |
| anhydrous calcium chloride (5 gr) | — | 21.0 | — |
| anhydrous sodium carbonate (5 gr) | — | 21.0 | — |

EXAMPLE 8

The procedure of Example 1 was repeated except that 3 gr of anhydrous sodium dithionite was mixed with 12 gr of dried calcium hydroxide and the particulate components as shown in Table 8, and the absorption reaction was carried out at 50° C. For comparison, absorbing tests on the composition not containing, the compound having water of crystallization and the composition containing an anhydrous compound in place of the catalytic compound were carried out.

The results are shown in Table 8.

Table 8

| Compound having water of crystallization and amount thereof added | Time required for removing 50% of oxygen in the bottle | residual oxygen (% by volume) | residual sulfurous acid gas (ppm) |
|---|---|---|---|
| Example | | | |
| sodium thiosulfate pentahydrate (4 gr) | 15 minutes | less than 0.2 | less than 1 |
| copper sulfate pentahydrate (5 gr) | 2 hrs | " | " |
| Control | | | |
| none | — | 21.0 | — |
| anhydrous sodium thiosulfate (4 gr) | — | 21.0 | — |
| anhydrous copper sulfate (5 gr) | — | 21.0 | — |

EXAMPLE 9

The procedure of Example 5 was repeated except that 9 gr of anhydrous sodium dithionite was mixed with the components as shown in Table 9, and absorption reaction was carried out at 90° C.

Table 9

| Compound having water of crystallizaton and amount thereof added (gr) | After one week * | After one month |
|---|---|---|
| Calcium chloride dihydrate (15 gr) | 98.2 | 96.9 |
| barium chloride dihydrate (9 gr) | 99.2 | 98.0 |
| sodium carbonate monohydrate (15 gr) | 99.0 | 97.9 |
| CaSO$_4$ · ½ H$_2$O (81 gr) | 99.1 | 98.2 |
| molybdic acid monohydrate (60 gr) | 98.4 | 97.5 |
| sodium acetate trihydrate (15 gr) | 98.3 | 97.1 |
| nickel sulfate heptahydrate (15 gr) | 99.0 | 98.4 |

* shows the ratio of the oxygen absorption of each mixture aliquot left standing for the following specified periods to that of each mixture aliquot which was not left standing.

EXAMPLE 10

Three grams of anhydrous sodium dithionite (85% pure) was mixed with the particulate components as shown in Table 10 in the amount as shown in Table 10 in a nitrogen atmosphere. Test procedure and gas analysis were carried out in the same way as in Example 1. For comparison, the above procedure was repeated except that anhydrous sodium sulfate was used in place of the sodium dithionite. The results are shown in Table 10. It is apparent from the above results that the mixture of anhydrous sodium sulfite and a compound having water of hydration does not absorb oxygen.

Table 10

| | Compounds having water of crystallization and amount of the compound added (gr) | Amount of dried calcium hydroxide added | Time required for removing 50% of oxygen in the bottle | Gas analysis after 72 hours | |
|---|---|---|---|---|---|
| | | | | residual oxygen (% by volume) | residual sulfurous acid gas (ppm) |
| Example | ferrous sulphate heptahydrate (0.45 gr) | 12 gr | 23 hrs | less than 0.2 | less than 1 |
| | sodium sulphate decahydrate (0.10 gr) | 12 gr | 1 hr | " | " |
| Control | ferrous sulphate heptahydrate (0.45 gr) | — | — | 21 | " |
| | sodium sulphate decahydrate (0.10 gr) | — | — | 21 | " |

What we claim is:

1. An oxygen absorbent comprising a dithionite and at least one compound having water of hydration.

2. The absorbent as defined in claim 1 wherein the dithionite is selected from the group consisting of sodium dithionite and zinc dithionite.

3. The absorbent as defined in claim 1 wherein the compound having water of crystallization in the range of from about 0.2 parts by weight to about 2000 parts by weight is used per 100 parts by weight of the dithionite.

4. An oxygen absorbent comprising a dithionite, at least one compound having water of hydration and at least one anhydrous alkaline material.

5. The absorbent as defined in claim 4 wherein the dithionite is selected from the group consisting of sodium dithionite and zinc dithionite.

6. The absorbent as defined in claim 4 wherein the compound having water of crystallization in the range of from about 0.2 parts by weight to about 2000 parts by weight is used per 100 parts by weight of the dithionite.

7. An oxygen absorbent comprising a dithionite, at least one compound having water of hydration and at least one absorbent.

8. The absorbent as defined in claim 7 wherein the dithionite is selected from the group consisting of sodium dithionite and zinc dithionite.

9. The absorbent as defined in claim 7 wherein the compound having water of crystallization in the range of from about 0.2 parts by weight to about 2000 parts by weight is used per 100 parts by weight of the dithionite.

10. An oxygen absorbent comprising a dithionite, at least one compound having water of hydration, at least one anhydrous alkaline material and at least one absorbent.

11. The absorbent as defined in claim 10 wherein the dithionite is selected from the group consisting of sodium dithionite and zinc dithionite.

12. The absorbent as defined in claim 10 wherein the compound having water of crystallization in the range of from about 0.2 parts by weight to about 2000 parts by weight is used per 100 parts by weight of the dithionite.

* * * * *